US009314850B2

(12) United States Patent
Vidor (10) Patent No.: US 9,314,850 B2
(45) Date of Patent: Apr. 19, 2016

(54) CLAMPING AND LOCKING DEVICES AND SUPPORT STRUCTURES FOR CUTTING TUBES

(71) Applicant: Bela Vidor, Oakland, CA (US)

(72) Inventor: Bela Vidor, Oakland, CA (US)

( * ) Notice: Subject to any disclaimer, the term of this patent is extended or adjusted under 35 U.S.C. 154(b) by 0 days.

(21) Appl. No.: 14/590,384

(22) Filed: Jan. 6, 2015

(65) Prior Publication Data

US 2015/0217376 A1   Aug. 6, 2015

Related U.S. Application Data

(63) Continuation-in-part of application No. 13/937,603, filed on Feb. 2, 2014, now Pat. No. 8,956,070.

(51) Int. Cl.
*F16B 2/00* (2006.01)
*F16B 7/04* (2006.01)
*B23B 5/14* (2006.01)
*F16M 11/18* (2006.01)
*B23B 5/08* (2006.01)
*B23B 33/00* (2006.01)

(52) U.S. Cl.
CPC ... *B23B 5/14* (2013.01); *B23B 5/08* (2013.01); *B23B 33/00* (2013.01); *F16B 7/0473* (2013.01); *F16M 11/18* (2013.01); *B23B 2215/72* (2013.01); *B23B 2260/004* (2013.01); *B23B 2260/03* (2013.01); *B23B 2260/116* (2013.01); *Y10T 82/10* (2015.01); *Y10T 82/16967* (2015.01); *Y10T 83/7647* (2015.04); *Y10T 83/8821* (2015.04)

(58) Field of Classification Search
CPC ........ B27B 27/04; B27B 27/08; B27B 27/10; F16B 2/14; F16B 2/16; F16B 2/18; F16B 7/0446; F16B 7/0453; F16B 7/187; B23Q 3/005; E04B 2001/5881
USPC ............. 403/322.4, 374.1, 374.2, 374.5, 387, 403/400, 409.1; 83/446, 477.2
See application file for complete search history.

(56) References Cited

U.S. PATENT DOCUMENTS

| 4,641,983 A * | 2/1987 | Strassle .................. E04B 2/766 403/12 |
|---|---|---|
| 6,205,897 B1 | 3/2001 | Carter |
| 6,360,642 B1 | 3/2002 | Miller et al. |
| 8,814,461 B2 | 8/2014 | Vine |
| 2010/0186235 A1 | 7/2010 | Schwartz et al. |

* cited by examiner

*Primary Examiner* — Joshua Kennedy
(74) *Attorney, Agent, or Firm* — Adams Law Office; Sharon Adams (57) ABSTRACT

Systems and devices for cutting annular objects comprising a structure built from t-slot profiles and clamping devices where an vertically adjustable t-slot profile is connected with a cutting assembly comprising a worm gear that turns a cutting blade that cuts into an annular object, and drive wheels that turn the annular object at a much slower rate than the spinning rate of the cutting blade.

12 Claims, 12 Drawing Sheets

CLAMPING AND LOCKING DEVICES AND SUPPORT STRUCTURES FOR CUTTING TUBES

CROSS REFERENCE TO RELATED APPLICATION

This application claims the benefit of pending U.S. patent application Ser. No. 13/937,603 with a filing date of Feb. 2, 2014. This pending patent application is incorporated herein by reference. As provided in 37 CFR 1.78(c)(2), applicant identifies this application as a continuation-in-part of pending application Ser. No. 13/937,603. As encouraged in MPEP 608.04(b), this continuation-in-part specification incorporates applicant's desired amendments to the specification submitted in application Ser. No. 13/397,603.

STATEMENT REGARDING FEDERALLY SPONSORED RESEARCH

Not applicable.

NAMES OF THE PARTIES TO A JOINT RESEARCH AGREEMENT

Not applicable.

BACKGROUND OF THE INVENTION

1. Field of the Invention

The invention relates to systems and devices for securely clamping, unclamping, or moveably clamping metal profiles. Embodiments include securely and removeably clamping together metal profiles to build structures that may be used for any variety of reasons. In one embodiment, the invention may be used to accurately measure the distance from a saw blade by moveably clamping and unclamping profiles, where one profile is connected with a side fence at a specific distance from the saw blade as needed to cut a specific size of plastic, metal, wood, or other material. Additional embodiments may be used to moveably clamp one metal profile to another, to support cutting blades, turning devices, or any similar devices.

2. Description of the Related Art

There are many situations where t-slotted profiles made of aluminum, steel or other materials are used to build structures, including trade show booths, machine bases, tool racks, fixtures, workbenches, assembly stations, display structures, storage structures and more. Many existing clamping devices are designed to permanently secure one profile to the next.

A non-limiting exemplar description of related art involves side fences used to cut material while using a power saw. A common practice involves holding the sheet of material, or a tube, with one hand while operating the on/off switch of the cutting blade with the other hand. This practice requires absolute concentration on the part of the saw operator, and physical strength to hold the material in place. If the operator loses hold of the sheet or tube of material, a sharp piece of jagged material may fly out at high velocity, endangering the operator or others in the area.

In addition, while the cutting blade is running, vibration may cause the sheet or tube of material to creep out of position, resulting in pieces that may be inaccurate in size, out of alignment, or improperly shaped. It may be necessary to cut sheets or tubes of plastic, metal or other material into identical sizes and shapes, as a non-limiting background example, picture framers often need multiple pieces of clear plastic in the same shape, square, rectangular, circular, triangular, or any other shape.

In other embodiments, there may be situations where metal profiles are used to build structures. These structures may be held together with any variety existing fasteners. These include end fasteners, anchor fasteners, double anchor fasteners, dynamic hinges, structural hinges and other types of connectors. However, these do not allow for easy unclamping, or for moveable clamping one profile to another.

BRIEF SUMMARY OF THE INVENTION

Embodiments of invention are directed to systems and devices for securely and easily clamping t-slotted metal profiles to each other, and for moveably clamping t-slotted metal profiles to each other. The clamping devices allow for secure clamping and easy unclamping. The clamping device may move along a slot in a first t-slot profile, allowing the device to clamp at different places along the first t-slot profile.

The clamping device is comprised of a foot 11 connected by a linking rod 10 to assembly 15. Assembly 15 connects with a second t-slot profile 22, wherein the second t-slot profile 22 has cavity 220. Assembly 15 is sized to snugly fit within cavity 220.

Elevator 9 is connected via linking rod 15 to foot 11. Upon manipulating handle 1, elevator 9 and connecting rod 10 and foot 11 lift, resulting in foot 11 compressing against the t-slot, and locking the device in place.

In some embodiments, second t-slot 22 may function as a side fence for use with a power saw. In these embodiments, a first profile 21 may run perpendicular to the saw blade and may optionally have markings which may be used to measure the distance from the saw blade. The clamping device may be used to moveably clamp and unclamp second profile 22 connected with a side-fence to the first profile 21. In some embodiments, the side-fence may be adjustable, to create cuts of different angles, or the side-fence may be made of a specific material or strength.

Other embodiments of the invention allow for moveable and secure clamping and unclamping of a first t-slot profile to a second t-slot profile. This has numerous applications and embodiments, including rapid construction of trade show booths, display assemblies, and other structures that need to be securely clamped together, and easily unclamped.

Other embodiments of the invention allow for the use of clamped t-slot profiles to create a structure to cut annular objects, including as a non-limiting example, plastic tubes. The structure may be formed from t-slot profiles, with a rear fence that may be adjusted to cut specific lengths of tubing.

Additional embodiments comprise using the clamping devices to moveably slide one t-slot profile along a plurality oft-slot profiles.

In another embodiment, a fence is connected with a t-slot profile 122 wherein both the fence and t-slot profile are perpendicular to two parallel t-slot profiles. The clamping device moveably connects the perpendicular t-slot profile with the two parallel t-slot profiles, thereby allowing the fence/t-slot assembly to slide between the two parallel t-slot profiles.

In some embodiments, the t-slot profiles and clamping assemblies are used to build a structure for supporting a cutting assembly 150. The cutting assembly is connected with t-slot profile 222 and is comprised of a cutting blade 151 that may be lowered to cut annular object 133. After lowering the cutting assembly, and turning on the power source, clutch wheels 141 ensure that the annular object does not prematurely spin, thereby allowing blade 151 to bite into the annular object, and begin cutting. After the initial cut through the top wall of the annular object, the drive wheels 153 overcome the pressure applied via the clutch wheels 141, the annular object starts to rotate at a speed to allow the cutting blade to smoothly cut around the entire tube. In a preferred embodiment, the cutting blade remains in position as the annular object rotates one time. At the end of a single rotation, the annular object is fully cut, and the cutting assembly is raised.

DESCRIPTION OF THE SEVERAL VIEWS

DETAILED DESCRIPTION

The invention comprises systems and devices for securely clamping and easily unclamping t-slot profiles. The clamping devices may move along a first t-slot profile 21, allowing the invention to clamp at different places along the profile.

Figure 1:
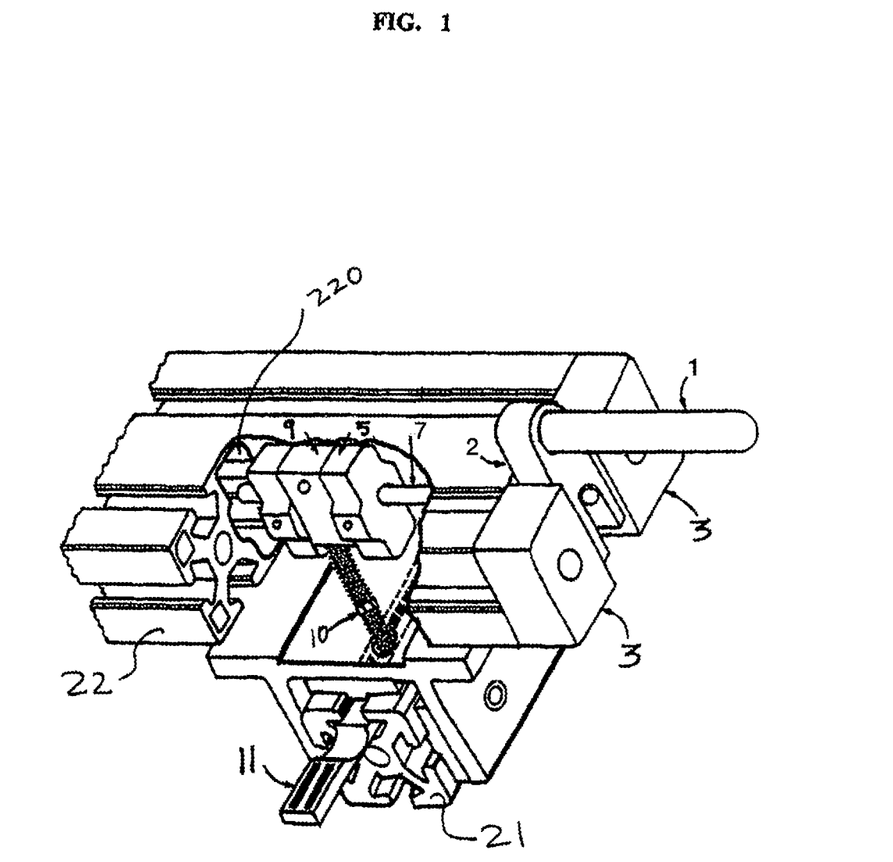
FIG. 1 is a perspective view of an embodiment of the invention, clamping two profiles together, with a cut-away view showing the assembly.
Figure 2A:
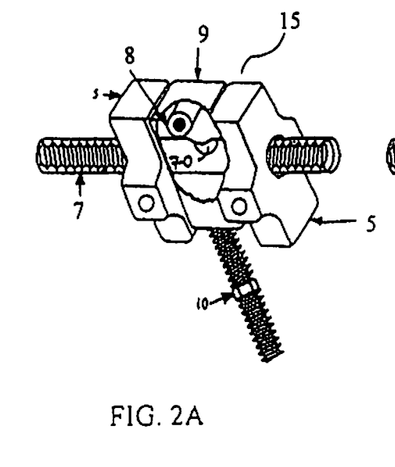
FIG. 2A is a perspective side view of an embodiment of the assembly, showing in cut-away view one position of the elevator and cam rod inside the assembly.
Figure 2B:
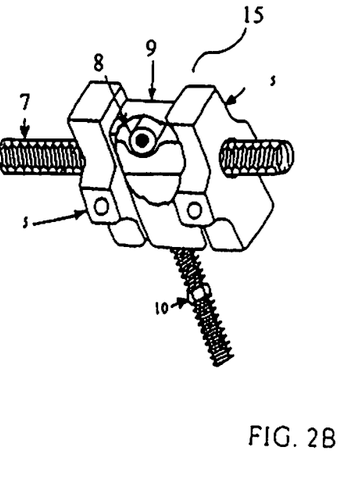
FIG. 2B is a perspective side view of an embodiment of the assembly, showing in cut-away view a second position of the elevator and cam rod inside the assembly.

The clamping device is comprised of locking foot 11, connected with linking rod 10, which is connected with elevator 9 within clamping assembly 15, as shown in FIGS. 1 and 2. Linking rod 10 and locking foot 11 are sized to moveably fit within a slot of first profile 21, and may move along the entire length of the slot in the first profile 21.

Figures 4A, 4B:
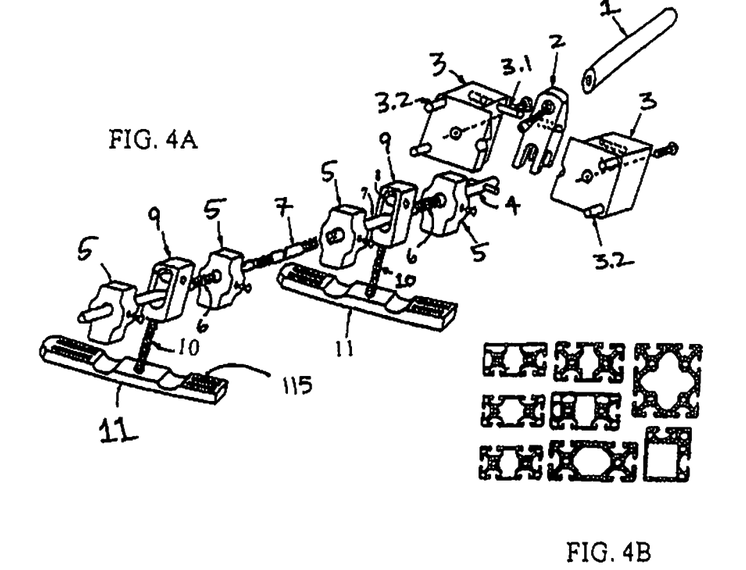
FIG. 4A is an exploded view of another embodiment of the invention.
FIG. 4B shows, as non-limiting examples, some t-slotted profiles with inside surfaces.

Locking foot 11 fits snugly within a slot of the first profile 21, as shown in FIG. 1. FIG. 4 shows exemplar first profiles 21, with various t-slot shapes and sizes. The locking foot 11 may be made of any size or shape, as needed to snugly, and moveable fit with the required slot and to travel along the slot.

Figure 5A:
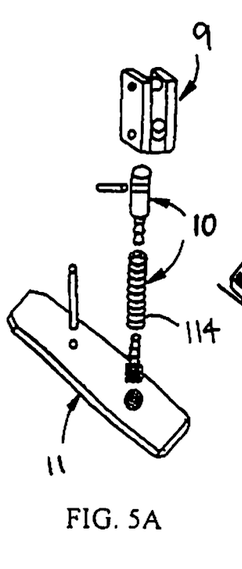
FIG. 5A is a perspective side view of one embodiment of the linking rod, lifting foot and other components of the invention.
Figure 5B:
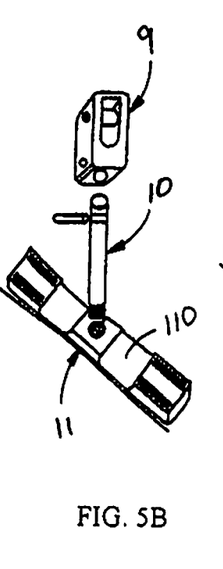
FIG. 5B is a perspective side view of one embodiment of the linking rod, lifting foot and other components of the invention.
Figure 5C:
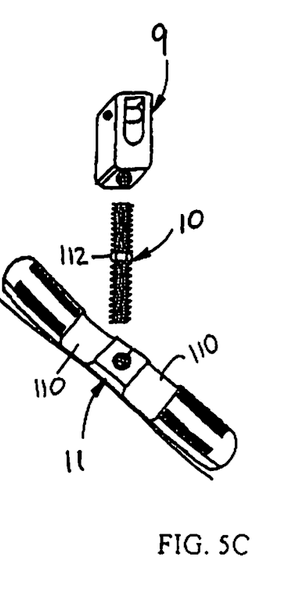
FIG. 5C is a perspective side view of one embodiment of the linking rod, lifting foot and other components of the invention.
Figure 6A:
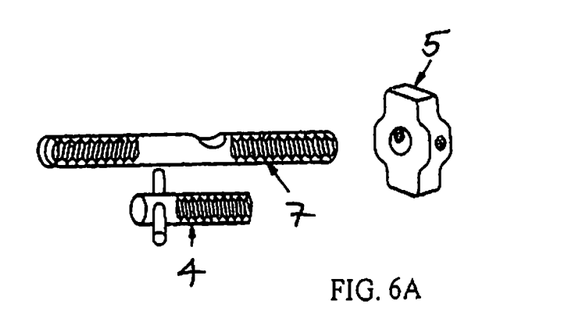
FIG. 6A shows one embodiment of components of the invention, with a circular push-pull elevating cam-rod and front stem.
Figure 6B:
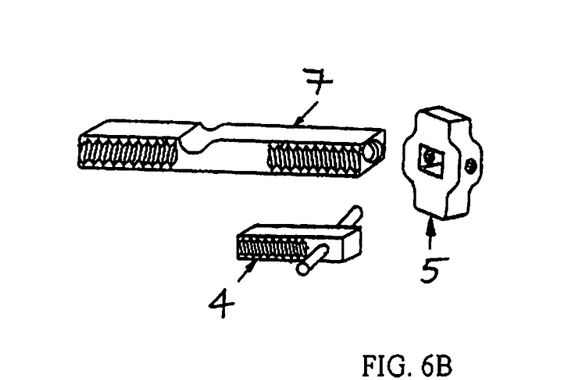
FIG. 6B shows another embodiment of components of the invention with a rectangular or square push-pull elevating cam-rod and front stem.

The locking foot may also have differing levels of stiffness or spring. In some embodiments, locking foot 11 may have cutouts 110. The size and depth of cutouts 110 affect the stiffness or springiness of the locking foot. There may be instances where little or no spring is needed, and for these situations, locking foot 11 may have no cutouts at all, as shown in FIG. 5. In other embodiments, locking foot 11 may have non-slip pads 115. In other embodiments, locking foot 11 may be of different lengths, as shown in FIG. 5.

In some embodiments linking rod 10 is a threaded linking rod, with a screw 112 that allows for precise adjustment of the height of linking rod 10. In other embodiments, linking rod 10 may be solid, or may have multiple parts including a spring 114, as shown in FIG. 5.

Assembly 15 is comprised of elevator 9, tightly sandwiched between guides 5. Linking rod 10 is connected with elevator 9. Elevator 9 may move up and down relative to guides 5, but will not move forward or backward, as shown in FIG. 2. Assembly 15 is sized, as needed, to snugly fit within cavity 220.

Push-pull elevating cam-rod 7 runs through guides 5 and elevator 9. Rod 7 contains pocket 70, and pocket 70 is positioned to be within elevator 9, as shown in FIG. 2.

Elevator 9 is connected with rolling bushing 8. In some embodiments, rolling bushing 8 may be a separate piece, and in other embodiments rolling bushing 8 and elevator 9 may be a single unit. Rolling bushing 8 and pocket 70 are positioned so that when the device is unclamped, bushing 8 rests within pocket 70. When the operator manipulates handle 1, rod 7 moves forward (or backward) relative to bushing 8, and bushing 8 rises out of pocket 70. As bushing 8 moves out of pocket 70, elevator 9 rises up, as shown in FIG. 2. When elevator 9 lifts up, locking foot 11 is also lifted via linking rod 10, thereby compressing the locking foot 11 against the inside of the t-slot in the first profile 21.

In some embodiments, pocket 70 is on the top of rod 7, while in other embodiments, pocket 70 may be on the bottom on rod 7, or in any of position on rod 70 that is within elevator 9.

Figure 3:
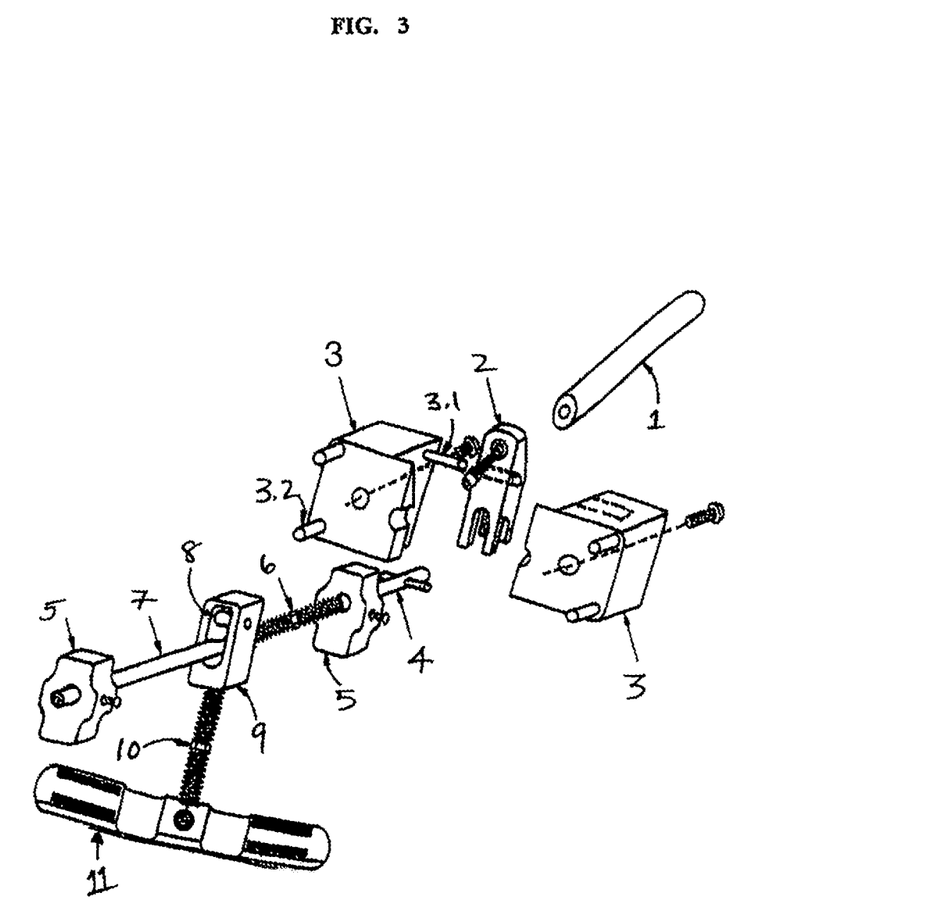
FIG. 3 is an exploded view of an embodiment of the invention.

Rod 7 moves forward or backward in response to operator manipulation of handle 1. In some embodiments, handle 1 is connected with fulcrum fork 2, as shown in FIG. 3. Manipulating handle 1 causes fulcrum fork 2 to pivot on fulcrum pin 3.1. Upon pivoting, fork 2 engages push/pull pin 3.1 and moves pin 3.1 forward (or backward). In some embodiments, pin 3.1 is connected with rod 7, so than when the operator manipulates handle 1, fork 2 pushes pin 3.1, resulting in rod 7 moving backward relative to elevator 9 and bushing 8. Bushing 8 will move out of pocket 70, causing elevator 9 to rise up, lifting locking foot 11 up and pressing it against the t-slot of the first profile 21. The clamping device is thereby securely locked in place.

To unlock the device, the operator manipulates handle 1, moving rod 7 until bushing 8 rests in pocket 70. This allows elevator 9 to descend, thereby causing locking foot 11 to move away from the inside of the first profile t-slot 21. In the unlocked position, elevator rolling bushing 8 rests within pocket 70 of push-pull elevating cam-rod 7.

In some embodiments, pin 3.1 is connected with front stem 4 which in turn pushes the threaded linking rod 6 that is in turn connected with rod 7, which moves relative to bushing 8. In some embodiments front stem 4 is an internally threaded stem.

In some embodiments, fulcrum pin 3.1 is held in position by fulcrum support 3, as shown in FIG. 3. Fulcrum support 3 is comprised of fulcrum pin 3.1 and profile connection pin 3.2. In some embodiments, profile connection pin 3.2 may connect the clamping device to the second profile.

In some embodiments, the clamping device may be used to moveably position a side fence on a power saw, to guide the saw operator in cutting a desired size or shape of material. In these embodiments, a first t-slot profile 21 runs perpendicular to the direction of the saw blade cut, and may optionally be used to measure the distance from the saw blade. In some embodiments, a second t-slot profile 22 is perpendicular to the first profile 21, as shown in FIG. 1. In these embodiments, profile 22 is parallel to the saw blade, and may act as a side fence, or may be connected with a side fence. Second profile 22 may be of any length, as needed.

In these embodiments, the operator engages handle 1 to unlock the clamping device, and may move the device to the distance desired from the saw blade. The operator manipulates handle 1 to lock the clamping device, connected with profile 22 and side fence, at the desired location. Once clamped, the device will remain locked and thereby securing profile 22 and side fence at the desired distance while the operator turns on the saw blade and cuts the material to the specified size. After finishing the cut, the operator may engage handle 1 to unclamp the device, and reposition the clamping device and side fence, as necessary.

In other embodiments, second t-slot 22 may be connected with an adjustable side-fence, to create cuts of different angles. In these embodiments, the second profile 22 may adjust to create an angle, or second profile 22 may be connected with a device that adjusts to create angled saw cuts.

Second profile 22 may be connected with various types of side fences to create a stronger or weaker side fence, or an adjustable side fence, or to a side-fence made of a specific material or strength. For example, if cutting a plurality of sheets of plastic, metal, wood or other material, the side fence may be made of stronger material.

Other applications include using the invention as a safety load-bearing unit to keep outdoor high-rise portable maintenance elevators from suddenly falling to the ground.

In some embodiments, the clamping devices may be linked with multiple clamping assemblies in a row, as shown in FIG. 4, using threaded extension rods 12, with adjustability. This clamping and locking device may be operated in a parallel relationship direction, or a 90 degree relationship direction. The clamping grip is adjustable to a load well above 50 pounds per square inch.

Other embodiments of the invention comprise using the clamping devices to clamp t-slot profiles to each other, to create easy-to-assemble structures, or structures that are securely clamped together and easily unclamped, as needed. The first profile 21 and the second profile 22 may be made of any shape or size, as needed to create a desired structure.

Figure 7:
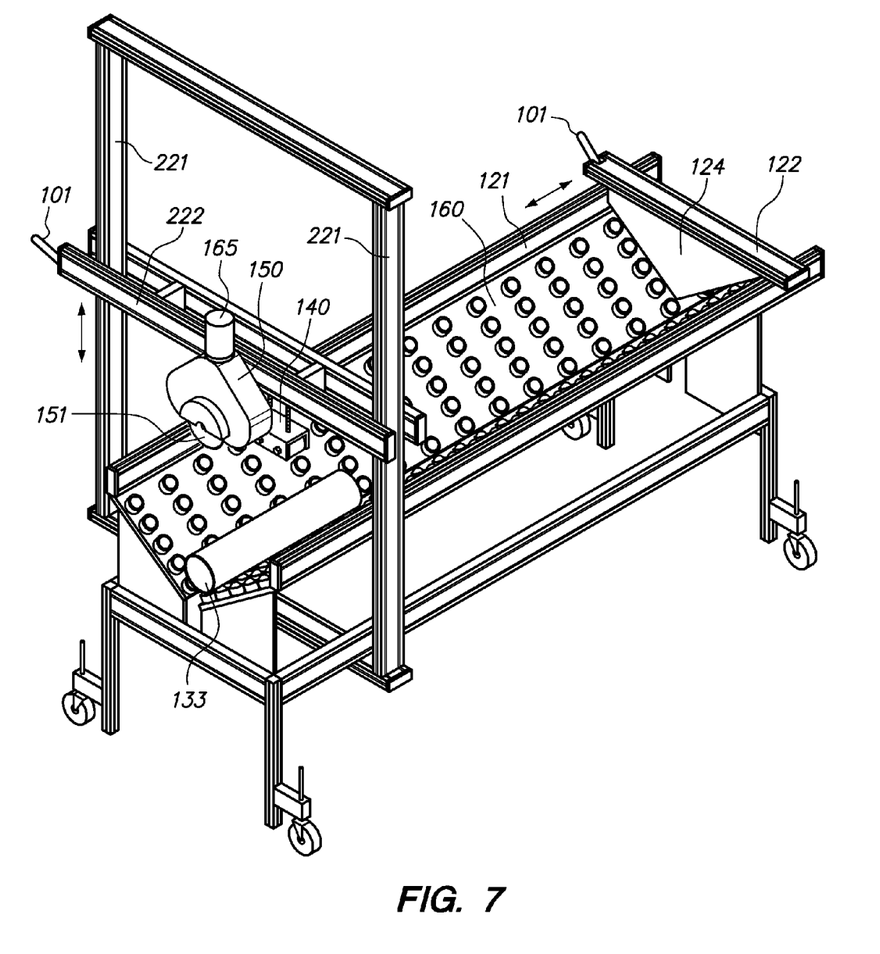
FIG. 7 is a front perspective view of an embodiment of the invention, where t-slot profiles and clamping devices create a structure for cutting annular objects.

As shown in FIG. 7, t-slot profiles may be connected to form a structure that is used to support a device for cutting tubes or other annular shapes. The word "tube" and phrase "annular object" are used interchangeably herein and shall have the same meaning.

T-slot profile 122 is connected with a rear fence 124, and is moveably connected with profiles 121 by the clamping device described herein. T-slot profile 122 and rear fence 124 may move forward and backward along parallel t-slot profiles 121, as indicated by the arrow in FIG. 7. Movement along parallel t-slot profiles allows adjustment and positioning of rear fence 124 against the rear of a tube.

In one embodiment, support platform 160 is v-shaped and suspended between the two parallel t-slot profiles 121. The v-shaped support platform 160 holds and supports annular object 133. The rear fence 124 is v-shaped, sized to fit within v-shaped platform 160, and to allow the fence to contact tube 133. It is apparent that support platform 160 may be of any angle or shape that is capable of supporting an annular object, and likewise that rear fence 124 may be sized to fit within any size or shape support platform 160.

Annular object 133 may be made of any material that is capable of being cut by cutting blade 151. Non-limiting examples of the materials include plastic, metal, polyvinyl chloride, ceramic, and glass.

In a preferred embodiment, horizontal t-slot profiles 121 are securely clamped to vertical t-slot profiles 221 at the front of the structure. T-slot profile 222 is horizontal and perpendicular to t-slots 221. T-slot 222 is moveably connected with the two vertical t-slot profiles 221 using the clamping device described herein, and may be moveably clamped along profiles 221 and securely clamping t-slot profile 222 at the desired height using handle 101 of the clamping device. In another embodiment, a wheel 223 may be connected with a drive train that moves t-slot profile up and down. It is apparent that any methods or devices known may be used to move t-slot profile 222 up and down parallel profiles 221, and that the up and down motion may be manually or automatically controlled.

In some embodiments, a cutting assembly 150 is connected with profile 222. Cutting assembly 150 is comprised of cutting blade 151, drive wheels 153, gears 152, worm gear 154, drive shaft 155 and a power source 165.

Figure 8:
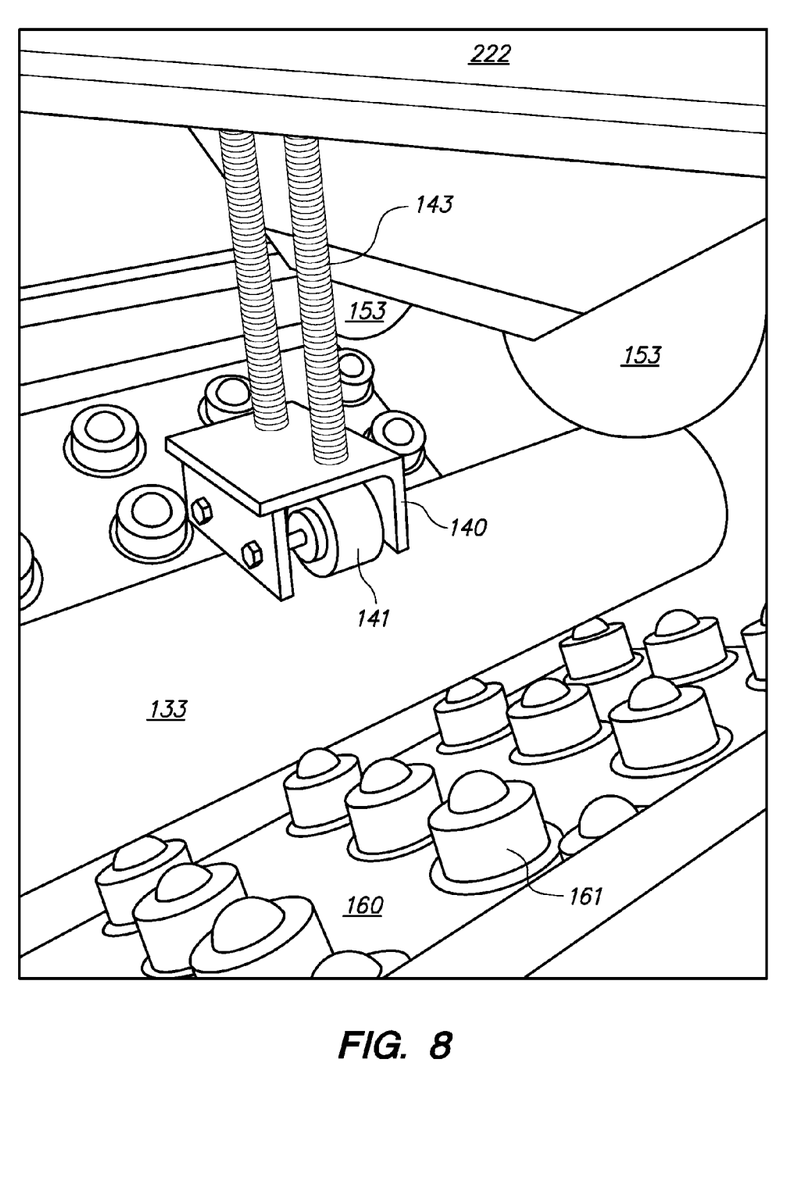
FIG. 8 is a close-up rear perspective view of a part of the embodiment of FIG. 7, showing clutch-wheels in contact with an annular object.

As shown in FIG. 8, as cutting assembly 150 is lowered, clutch wheels 141 connect with and contact tube 133. Clutch wheels 141 are housed in clutch wheel housing 140. Housing 140 is connected with at least one spring 143, or in a preferred embodiment two springs 143. The elastic potential energy of springs 143 is used to apply pressure so that the clutch wheels 141 have the appropriate pressure on annular object 133. It is apparent that the elastic potential energy of the spring may be adjusted as needed, depending on the material or thickness of annular object 133, the blade type or speed, or any other factor, as needed.

The pressure applied through springs 143 to clutch wheels 141 is of sufficient pressure to ensure that tube 133 does not prematurely spin or move out of place, thereby allowing blade 151 to bite into tube 133, and begin cutting tube 133.

The operator turns activates the power source, and lowers the cutting assembly, by lowering t-slot profile 222. When the cutter assembly 150 is lowered, the clutch wheels 141 first come in contact with tube 133, and apply pressure to tube 133. As cutter assembly 150 continues to lower, drive wheels 153 and blade 151 next come into contact with tube 133. Both drive wheels 153 and blade 151 are spinning from power source 165. Spinning blade 151 will cut into tube 133. In a preferred embodiment, the blade will cut through the top wall of stationary tube 133, and reach the empty space inside the tube, as shown in FIG. 11C.

During this time, both drive wheels 153 and cutting blade 151 are spinning, yet the tube is stationary due to the pressure applied from clutch wheels 143. The cutting blade 151 cuts through the top wall of the annular object and then drive wheels 153 come to rest on the top outside wall of annular object 133.

Both drive wheels 153 rotate in the same direction. The energy transmitted from the spinning drive wheels 153 will overcome the pressure applied via clutch wheels 141 to tube 133, and tube 133 will begin to rotate. Drive wheels 153 may optionally have traction material 158 around the outside, to allow for better contact with tube 133. Traction material 158 may have tread or may be solid, and may be made from rubber, plastic, cloth, or any other suitable material.

Cutting blade 151 rotates from a fixed position, while drive wheels 153 spin tube 133. The device is geared so that drive wheels 153 rotate at a rate that spins tube 133 at a much slower speed that the cutting blade, so that the cutting blade 151 will be able to make a clean cut around the entire tube while the tube rotates. In the preferred embodiment, after tube 133 has rotated once around, the cut is complete.

It is important to have a proper ratio between the rate of revolution of cutting blade 151 and the rate of revolution of drive wheels 153 that spin tube 133. The differential rate of revolution is necessary, because cutting blade 151 must spin at a much faster rate than tube 133 rotates. The cutting blade 151 must spin at sufficiently rapid speed to cut into annular object 133. The rotation rate of cutting blade 151 may vary depending on the material or wall thickness of annular object 133. Likewise, the rate that the tube spins may be varied as needed, depending on the diameter of the tube, the wall thickness or tube material.

In some preferred embodiments, when cutting plastic, polyvinylchloride, polycarbonate, acrylic or other tubes of similar density material, the preferred ratio is about 4,000-8,000 revolutions per minute (rpm) for cutting blade 151, while drive wheel 153 revolves at about 20-40 rpm. The device provides for both of these very different rpms in a single device by the gearing ratio.

The device includes a power source 165. In some preferred embodiments, power source 165 is either an AC or DC motor. The power source needs to be of sufficient capacity to turn cutting blade 151, rotate drive wheels 153, and spin tube 133. In some embodiments, either the power source or drive shaft 155 is capable going forward and backward, in other words reversible and capable of making the cutting blade go forward or backward.

The power source is connected with shaft 155 that is connected with worm gear 154. Worm gear 154 is a dual-thread worm gear, comprised of both left-hand and right-hand threads, a shown in FIG. 9. The dual-thread worm gear is disposed between two gears 152, and slightly angled relative to the two gears 152.

Figure 9:
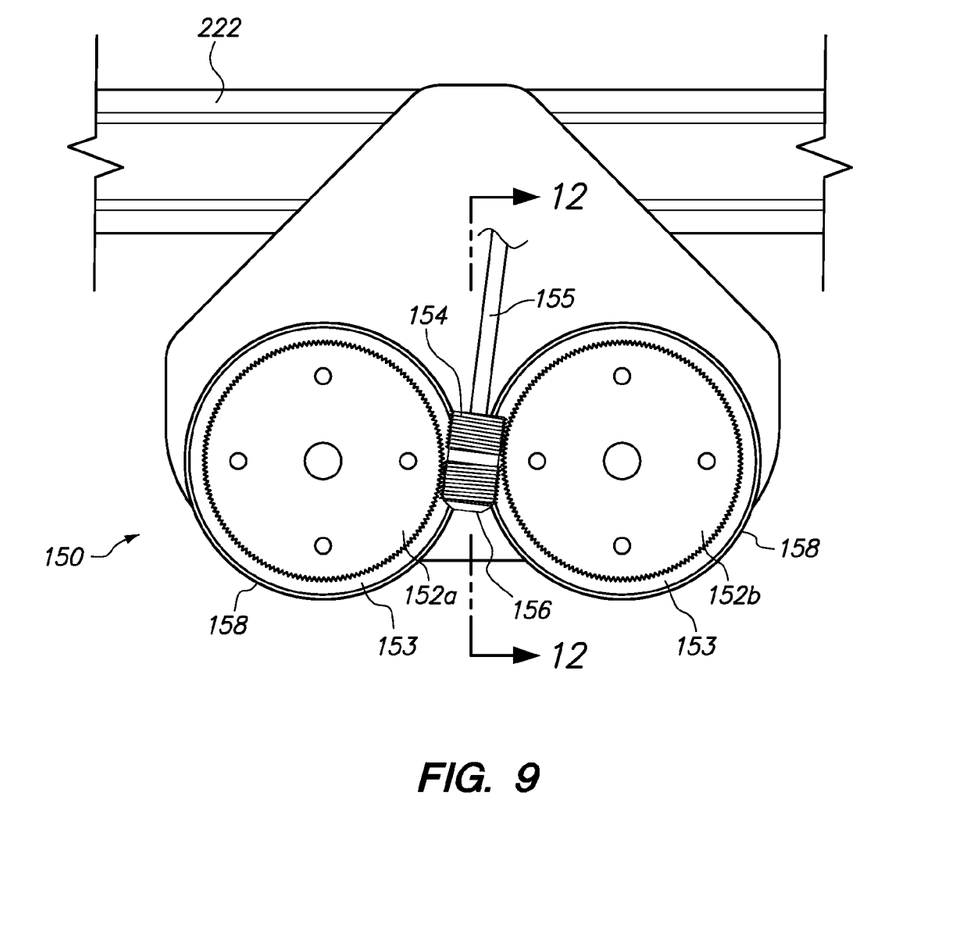
FIG. 9 is front plan view of internal components of the cutting assembly of the embodiment in FIG. 7.

In a preferred embodiment, these two gears are nylon spur gears. Nylon is a preferred material for gears 152 because nylon does not require lubrication in this application. It is apparent that gears 152 need not be spur gears, and need not be made of nylon. Gears 152 may be of any type or material capable of transmitting rotational energy.

The gears are essential to calibrating the different spin rates for the cutting blade and drive wheels. The diameter of the gears may be varied, and the number of teeth or spacing of gear teeth may be varied to obtain the proper ratio between the cutting blade rpm and the rpm of the drive wheels. In a preferred embodiment, the nylon spur gears have closely spaced v-shaped teeth.

The angle of the dual-thread worm gear is such that the top threads of the worm gear are in contact with one gear and the bottom threads are in contact with the other gear. The dual-threaded worm is angled, and the gears are spaced, so that each gear 152 is in connection with only one thread direction on worm gear 154. The dual thread nature of worm gear 154 means that when worm gear 154 turns, both gears 152 spin in the same direction.

As a non-limiting example, as shown in FIG. 9, the top, right-hand threads of worm gear 154 are in contact with the nylon spur gear 152b on the right, and the bottom, left-hand threads of worm gear 154 are in contact with the nylon spur gear 152a on the left. It is apparent that the worm gear angle may be changed so that the top threads may be in contact with gear 152a, and it is likewise apparent that thread direction may be changed.

The dual-threaded gear worm 154, in a preferred embodiment, is made of brass because there is no need to lubricate a brass worm, and the worm will have sufficient strength to turn the gears, feed wheel and cutting blade. It is apparent that the worm may be made of any material that meets these requirements, or even using a material that requires lubrication, if so desired.

Figure 12:
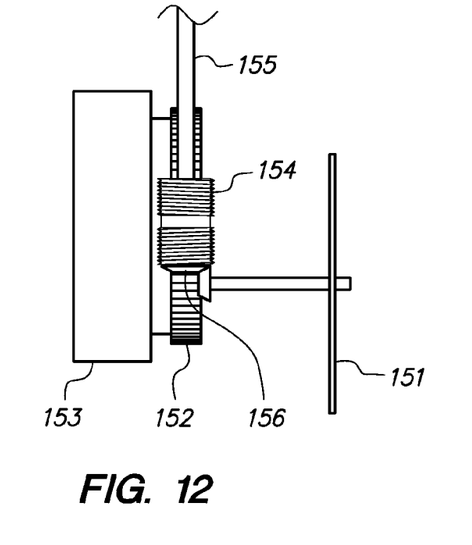
FIG. 12 is a close-up cross-sectional side view of the line indicated in FIG. 9.

As shown in FIG. 12, at the bottom of worm gear 154 is a hypoid gear that transmits the rotational energy from the worm gear at a 90-degree angle to cutting blade 151.

Each gear 152 is connected with a drive wheel 153. In one embodiment, as shown in FIG. 9, drive wheel 153 is a metal wheel with rubber tread 156. It is apparent that drive wheels 153 may be made of any material, and may or may not have tread 156, as needed to connect with and turn tube 133.

The entire cutting assembly must have proper gear ratios to obtain high rotational speed for the cutting blade, while from the same drive shaft and power source, simultaneously obtaining a much slower rotational speed for the drive wheels. These rotational speeds may vary depending on the type of material being cut, or the wall thickness of the annular object. This may be accomplished by altering the number of teeth or spurs on gears 152, the gearing of the hypoid gear, by changing the diameter of gears 152 or wheels 153, or by any other method to obtain different rotational speeds.

Figure 10:
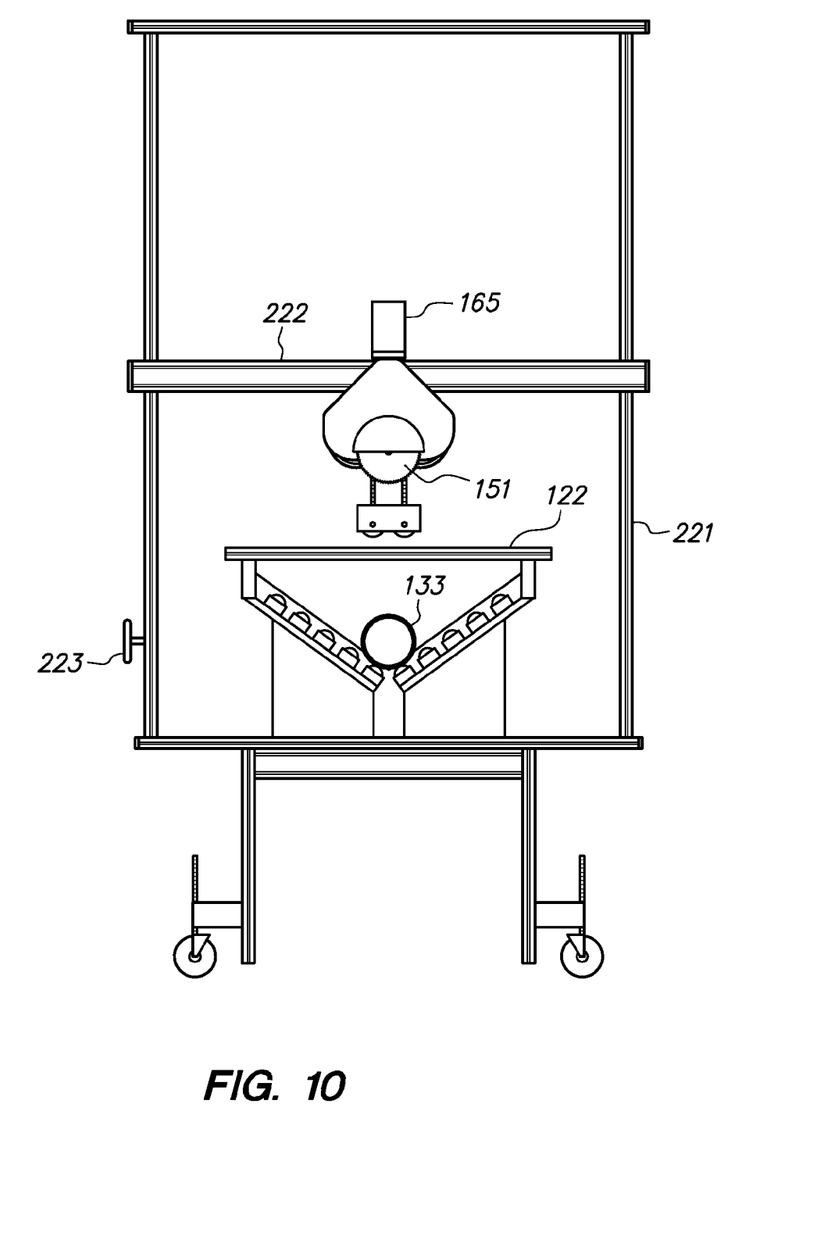
FIG. 10 is a front plan view of the cutting device.

Tube 133 is placed on support platform 160. In a preferred embodiment, as shown in FIGS. 7 and 10, support tray 160 is a "V"-shape, and angled so that any annular object may be supported by platform 160. In a preferred embodiment the bottom of the "V"-shape is open, so that dust or particulates generated from cutting will fall through the opening, and may be collected below the support platform 160.

In some embodiments, ball transfer units 161 are placed on top of support platform 160, and in a preferred embodiment these ball transfer units are nylon, although they may be made from any appropriate material. These ball transfer units 161 have small rollers on the top, so that annular object 133 slides along platform 160.

To operate the device, the operator may adjust rear fence 124, so that it is in contact with the rear of tube 133. The operator may manipulate handle 101 to unlock the clamping device, as described elsewhere herein, and move t-slot profile 122 forward and back long parallel t-slot profiles 121 into a desired position so that rear fence 124 rests at the rear of tube 133, as shown in FIG. 7. Once the fence/t-slot assembly is positioned at the rear of tube 133, the operator may manipulate handle 101 to securely clamp fence 124 at the desired location.

In other methods, the tube may be placed on support platform 160, and the cutting may occur without positioning rear fence 124 at the rear of tube 133. Use of the rear fence is optimal for obtaining a specific size cut, or to cut multiple pieces of the same size. Operation and movement of the t-slot profile and rear fence may be automatic or manual.

Once tube 133 is in place on support platform 160, and underneath cutting blade 151, the operator may adjust the height of cutting assembly 150. The height of cutting assembly 150 may be adjusted by moving t-slot profile 222 up and down parallel t-slot profiles 221, as shown in FIG. 7. This is accomplished by manipulating handle 101, unlocking the clamping device, and sliding t-slot profile 221 up and down parallel t-slot profiles 221. To operate the device, t-slot profile is positioned sufficiently high so that it is above the height of the top wall of annular object 133. As described above, tube 133 is positioned under cutting blade 151. Next, the operator may manipulate handle 101 to release clamping assembly, and slide t-slot profile 222 down toward annular object 133. In another embodiment, wheel 223 may be connected with a drive train to move t-slot profile 222 up and down parallel t-slot profiles 221. It is apparent that any methods or devices known may be used to move t-slot profile 222 up and down parallel profiles 221, and that the up and down motion may be manually or automatically controlled.

Figure 11A:
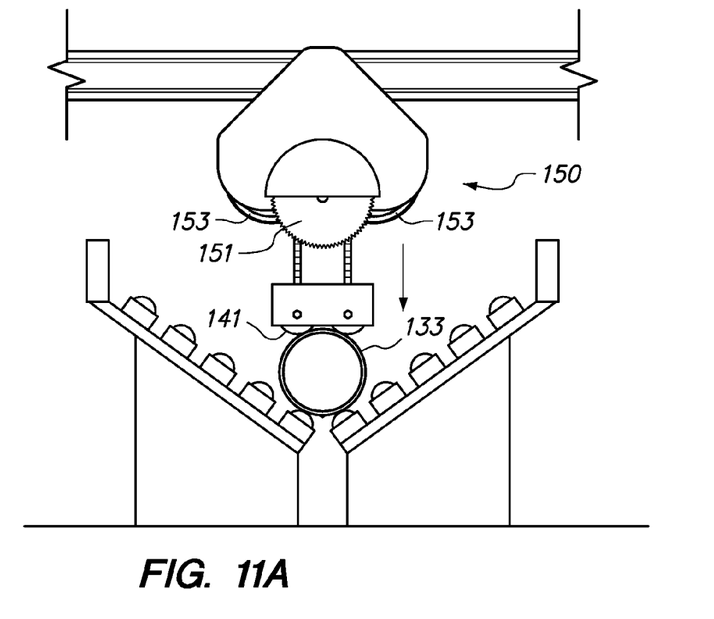
FIGS. 11A, B and C show close-up front plan views of stages of operation of the cutting device.
Figure 11B:
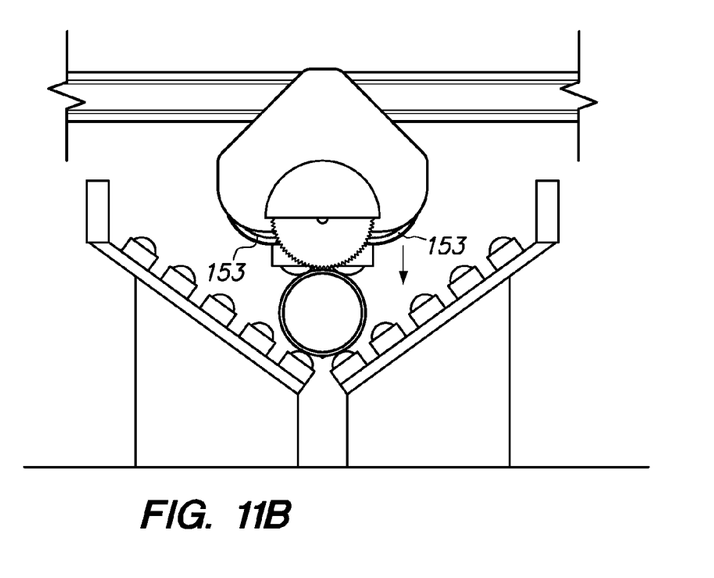
Figure 11C:
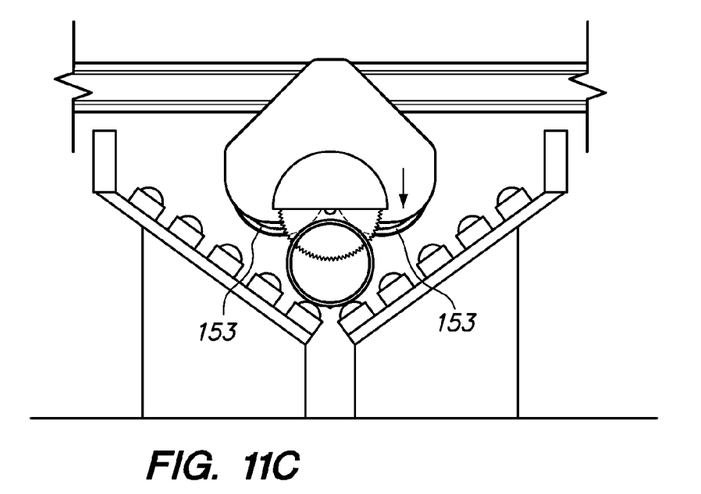

FIGS. 11A, 11B and 11C illustrate the cutting action. Power source 165 is activated to transmit energy to drive shaft 155 to rotate cutting blade 151 and wheels 153. Cutting assembly 150 is lowered, so that clutch wheels 141 are in contact with annular object 133 (also shown in FIG. 8). As cutting assembly 150 continues to lower, cutting blade 151 and drive wheels 153 come in contact with tube 133, as shown in FIG. 11B. The clutch wheels 141 must apply sufficient pressure to keep tube 133 stationary until cutting blade 151 has had time to cut all the way through the top wall of tube 133, as shown in FIG. 11C.

Clutch wheels 141 continue to apply pressure to tube 133. Eventually, the rotational force being applied through drive wheels 153 overcomes the pressure from clutch wheels 141, and tube 133 begins to spin. In a preferred method of operation, the tube spins one time, and the cut is complete.

As explained above, drive wheels 153 have a much lower rotational rate than the rotational rate of cutting blade 151. Because drive wheels 153 rotate so much slower, cutting blade 151 will be able to cut into the top wall of tube 133 while tube 133 is not rotating. Tube 133 is stationary for the initial cut, as it is held in place by clutch wheels 143.

The machine is geared so that after the initial cut, the rotational force from drive wheels 153 begins to spin tube 133. The tube spins at a rate that is slow enough so that cutting blade may smoothly and evenly cut through the wall of tube 133, as tube 133 rotates. The operator may use the clamping device to lock the cutting assembly at the desired height for cutting, or may manually control the height of the cutting assembly during the cutting operation.

After the cut is complete, the cutting assembly is raised by raising t-slot profile 222. T-slot profile 222 is raised by, if needed unlocking the clamping device and raising t-slot profile 222. In alternative embodiments the operator may manipulate wheel 223 to raise t-slot profile 222, or may manually raise it.

Rear fence 124 may be repositioned, as needed, either manually or automatically. Tube 133 is moved forward, or a new tube is placed on plate form 160, and the cutting operation is repeated as needed.

Profiles 21 or 22 may be connected with additional pieces that perform functions, as needed. Non-limiting examples include connections to shelves for displaying items; connections to movable arms for displaying items; or connections to decorative treatment for a background in a display.

The invention may be embodied in other specific forms without departing from the spirit or essential characteristics thereof. The embodiments disclosed in this specification are to be considered in all respects as illustrative and not restrictive, and all changes that come within the meaning and range of equivalency of the claims are intended to be embraced therein.

A recitation of "a" "an" or "the" is intended to mean "one or more" unless specifically indicated to the contrary. The use of the words "lift" "rise" "descend" "up" "forward" or "backward" is intended to mean "lift or lower", "rise or descend", "up or down", "forward or backward" unless specifically indicated to the contrary.

What is claimed is:

1. Systems and devices for moveably clamping and easily unclamping t-slot profiles comprising:
    two parallel t-slot profiles wherein each t-slot profile is comprised of metal forming at least one slot running the length of each parallel t-slot profile,
    an adjustable t-slot profile with a clamping device at one end, wherein the adjustable t-slot profile is perpendicular to the two parallel t-slot profiles, and wherein the clamping device connects one end of the adjustable t-slot profile with a first parallel t-slot profile and a second end of the adjustable t-slot profile connects with a second parallel t-slot profile,
        wherein one end of the clamping device snugly fits in a cavity within the adjustable t-slot profile, and
        wherein said second end of the adjustable t-slot profile is sized to moveably slide in the slot of a second parallel t-slot profile and is in moveable connection with the slot in the second parallel t-slot profile;
    the clamping device is comprised of an assembly which is comprised of an elevator and bushing tightly sandwiched between guides, a cam rod running through the elevator and guides, wherein the cam rod has a pocket that is positioned relative to the bushing within the elevator, and wherein the assembly is sized to securely fit within the cavity in the adjustable t-slot profile;
    a linking rod connecting the elevator to a locking foot sized to moveably fit within the slot of the first parallel t-slot profile, wherein when unclamped the locking foot is capable of moveably sliding inside the t-slot;
    the cam rod is connected with a handle, wherein manipulating the handle will move the cam rod, and thereby move the pocket relative to the bushing, lifting the elevator, linking rod and locking foot, compressing and securely clamping the locking foot to an inside surface of the slot in the first parallel t-slot profile, thereby clamping the adjustable t-slot profile at a specific distance along and perpendicular to, the two parallel t-slot profiles.

2. The device of claim 1 wherein a rear fence is connected with the adjustable t-slot profile, and both the rear fence and adjustable t-slot profile are parallel to a cutting blade.

3. The device of claim 2 wherein a v-shaped platform is connected with and suspended between the two parallel t-slot profiles.

4. The device of claim 1 wherein the adjustable t-slot profile is connected with a cutting assembly.

5. The device of claim 4 wherein the parallel t-slot profiles are vertical and the adjustable t-slot profile and cutting blade move up and down between the two vertical parallel t-slot profiles.

6. The device of claim 1 wherein the adjustable t-slot profile is comprised of a clamping device at the first end and a second clamping device at the second end.

7. The device of claim 1 comprising at least two adjustable t-slot profiles with a clamping device at one end, wherein each adjustable t-slot profile is moveably connected with, and perpendicular to, two parallel t-slot profiles.

8. The device of claim 7 wherein two parallel t-slot profiles are horizontal with a front end and a back end and with a support platform suspended between the horizontal t-slot profiles,
  wherein the back end is connected via a clamping device with a first adjustable t-slot profile and rear fence so that the first adjustable t-slot profile travels in a horizontal direction, and
  wherein the front end is connected with a second set of parallel t-slot profiles that are vertical, and wherein a second adjustable t-slot profile is connected with, and perpendicular to, the vertical parallel t-slot profiles so that the second adjustable t-slot profile travels in a vertical direction, and wherein said second adjustable t-slot profile is connected with a cutting assembly.

9. The device of claim 8 wherein the cutting assembly is comprised of a drive shaft connected with an angled dual-thread worm gear disposed between two gears so that the top threads of the worm gear engage with one gear and the bottom threads of the worm gear engage with the second gear resulting in both gear spinning in the same direction;
  two drive wheels where each gear is directly connected with a drive wheel,
  a hypoid gear at the bottom of the worm gear that connects a cutting blade to the worm gear so that the gears, drive wheels and cutting blade are parallel with each other and spin simultaneously when power is supplied via the power source,
  a clutch assembly comprised of at least one spring, a clutch wheel housing and a plurality of clutch wheels, and connected with the second adjustable t-slot profile so that both the clutch assembly and cutting assembly move simultaneously when the second adjustable t-slot profile is raised or lowered, and wherein said clutch wheels are lower than the cutting blade.

10. The device of claim 9 wherein the gear size is used to calibrate the differential between the cutting blade revolutions per minute and the revolutions per minute of the drive wheels.

11. The device of claim 9 wherein the number of gear teeth is used to calibrate the differential between the cutting blade revolutions per minute and the revolutions per minute of the drive wheels.

12. A method of operating the device of claim 9 comprising:
  manipulating the handle on the first adjustable t-slot profile to unclamp the clamping device,
  sliding the adjustable t-slot profile and rear fence along the two horizontal parallel t-slot profiles until the rear fence is positioned against the back end of an annular object that is resting on the support platform,
  turning on the power source to begin spinning the worm gear, cutting blade, gears, and drive wheels,
  manipulating the handle on the second adjustable t-slot profile to unclamp the clamping device,
  sliding and lowering the adjustable t-slot profile that is connected with the cutting assembly and clutch assembly along the two vertical parallel t-slot profiles so that first the clutch wheels, then the cutting blade, and then the drive wheels contact the top wall of the annular device, wherein the cutting blade cuts through the top wall of the annular object and then the drive wheels begin spinning the annular object allowing the stationary cutting blade to cut the spinning annular object;
  sliding and raising the adjustable t-slot profile after the cut is complete.

\* \* \* \* \*